United States Patent
Shimanuki et al.

(10) Patent No.: US 11,581,581 B2
(45) Date of Patent: Feb. 14, 2023

(54) LITHIUM ION SECONDARY BATTERY

(71) Applicant: NEC CORPORATION, Tokyo (JP)

(72) Inventors: Ikiko Shimanuki, Tokyo (JP);
Takehiro Noguchi, Tokyo (JP);
Daisuke Kawasaki, Tokyo (JP);
Takuya Hasegawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 290 days.

(21) Appl. No.: 16/611,335

(22) PCT Filed: May 17, 2018

(86) PCT No.: PCT/JP2018/019099
§ 371 (c)(1),
(2) Date: Nov. 6, 2019

(87) PCT Pub. No.: WO2018/212276
PCT Pub. Date: Nov. 22, 2018

(65) Prior Publication Data
US 2020/0168955 A1   May 28, 2020

(30) Foreign Application Priority Data
May 19, 2017   (JP) .............................. JP2017-099556

(51) Int. Cl.
*H01M 10/0569* (2010.01)
*H01M 10/0525* (2010.01)
(Continued)

(52) U.S. Cl.
CPC ....... *H01M 10/0569* (2013.01); *H01M 4/386* (2013.01); *H01M 10/0525* (2013.01);
(Continued)

(58) Field of Classification Search
CPC ........ H01M 10/0568; H01M 10/0569; H01M 10/0525; H01M 10/0585; H01M 4/386;
(Continued)

(56) References Cited

U.S. PATENT DOCUMENTS

| | | | |
|---|---|---|---|
| 2015/0140443 A1* | 5/2015 | Takahashi | H01M 4/505 29/623.5 |
| 2015/0243989 A1* | 8/2015 | Yamada | H01M 4/0416 427/113 |

FOREIGN PATENT DOCUMENTS

| | | |
|---|---|---|
| CN | 103682439 A | 3/2014 |
| CN | 104364958 A | 2/2015 |

(Continued)

OTHER PUBLICATIONS

International Search Report of PCT/JP2018/019099 dated Jul. 17, 2018 [PCT/ISA/210].

(Continued)

*Primary Examiner* — Osei K Amponsah
(74) *Attorney, Agent, or Firm* — Sughrue Mion, PLLC

(57) ABSTRACT

A purpose of the present invention is to provide a lithium ion secondary battery having improved battery characteristics. The lithium ion secondary battery according to the present invention comprises a negative electrode comprising a negative electrode active material comprising a silicon material and an electrolyte solution comprising an electrolyte solvent comprising an open chain sulfone compound, a fluorinated cyclic carbonate and an open chain carbonate and a supporting salt comprising $LiN(FSO_2)_2$.

11 Claims, 1 Drawing Sheet

(51) Int. Cl.
  *H01M 10/0568* (2010.01)
  *H01M 10/0585* (2010.01)
  *H01M 4/38* (2006.01)
  *H01M 4/02* (2006.01)

(52) U.S. Cl.
  CPC ... *H01M 10/0568* (2013.01); *H01M 10/0585* (2013.01); *H01M 2004/027* (2013.01); *H01M 2220/20* (2013.01); *H01M 2300/004* (2013.01); *H01M 2300/0034* (2013.01)

(58) Field of Classification Search
  CPC ... H01M 2004/027; H01M 2300/0034; H01M 2300/004; H01M 2220/20
  See application file for complete search history.

(56) References Cited

FOREIGN PATENT DOCUMENTS

| | | |
|---|---|---|
| CN | 104704671 A | 6/2015 |
| CN | 105074994 A | 11/2015 |
| CN | 105655644 A | 6/2016 |
| CN | 105742701 A | 7/2016 |
| CN | 105845977 A | 8/2016 |
| CN | 105960732 A | 9/2016 |
| JP | 2013-016456 A | 1/2013 |
| JP | 2013051342 A | 3/2013 |
| JP | 2014049294 A | 3/2014 |
| JP | 2014-203748 A | 10/2014 |
| JP | 2015-079636 A | 4/2015 |
| WO | 2013/183655 A1 | 12/2013 |
| WO | 2014/080870 A1 | 5/2014 |
| WO | 2014/080871 A1 | 5/2014 |
| WO | 2014/157591 A1 | 10/2014 |
| WO | 2017/154788 A1 | 9/2017 |

OTHER PUBLICATIONS

Communication dated Dec. 1, 2020, from the Japanese Patent Office in Application No. 2019-518861.

Chinese Office Action for CN Application No. 201880032881.1 dated Apr. 2, 2022 with English Translation.

* cited by examiner

LITHIUM ION SECONDARY BATTERY

CROSS REFERENCE TO RELATED APPLICATIONS

This application is a National Stage of International Application No. PCT/JP2018/019099, filed May 17, 2018, claiming priority to Japanese Patent Application No. 2017-099556, filed May 19, 2017, the contents of all of which are incorporated herein by reference in their entirety.

TECHNICAL FIELD

The present invention relates to a lithium ion secondary battery, a manufacturing method for a lithium ion secondary battery and a vehicle equipped with a lithium ion secondary battery.

BACKGROUND ART

Lithium ion secondary batteries are used in various applications. Accordingly, there is a demand for a lithium ion secondary battery that has high energy density and good life characteristics. For a battery having high energy density, deterioration in battery performance caused by decomposition of an electrolyte solvent may become a problem. Therefore, there is a demand for a durable electrolyte solvent.

It is known that $LiN(FSO_2)_2$ reacts with a positive electrode and/or a negative electrode to form a film on an electrode surface having an effect of preventing decomposition of an electrolyte solution. For this reason, the use of $LiN(FSO_2)_2$ as a supporting salt has been studied to improve battery life characteristics. Patent document 1 discloses a lithium ion secondary battery comprising an electrolyte solution comprising 0.6 mol/L or more of $LiN(FSO_2)_2$ as a supporting salt and 10 volume % or more of a fluorinated carbonate as a solvent. Patent document 2 discloses a lithium ion secondary battery comprising an electrolyte solution comprising 0.7 to 4 mol/L of $LiN(FSO_2)_2$ as a supporting salt and more than 0 to 15 volume % of a cyclic carbonate and 85 to 99 volume % of an open chain carbonate as solvents.

CITATION LIST

Patent Literature

Patent document 1: Japanese patent laid-open 2014-203748
Patent document 2: Japanese patent laid-open 2015-79636

SUMMARY OF INVENTION

Technical Problem

However, the carbonate based solvents of Patent documents 1 and 2 have a problem of low durability, although they are suitably used in electrolyte solvents containing $LiN(FSO_2)_2$ as a supporting salt. For this reason, even the lithium ion secondary batteries of the above patent documents do not have sufficient life characteristics and still have a problem in that the battery capacity is gradually reduced by repeating charge-discharge cycle. In addition, further improvement in other battery characteristics, such as rate characteristics and gas generation amount, is also desired. In view of the above problems, a purpose of the present invention is to provide a lithium ion secondary battery having improved battery characteristics.

Solution to Problem

The first lithium ion secondary battery according to the present invention comprises a negative electrode comprising a negative electrode active material comprising a silicon material and an electrolyte solution comprising an electrolyte solvent comprising an open chain sulfone compound, a fluorinated cyclic carbonate and an open chain carbonate and a supporting salt comprising $LiN(FSO_2)_2$.

Advantageous Effects of Invention

According to one embodiment of the present invention, it is possible to provide a lithium ion secondary battery having improved battery characteristics.

DESCRIPTION OF EMBODIMENTS

Figure 1:
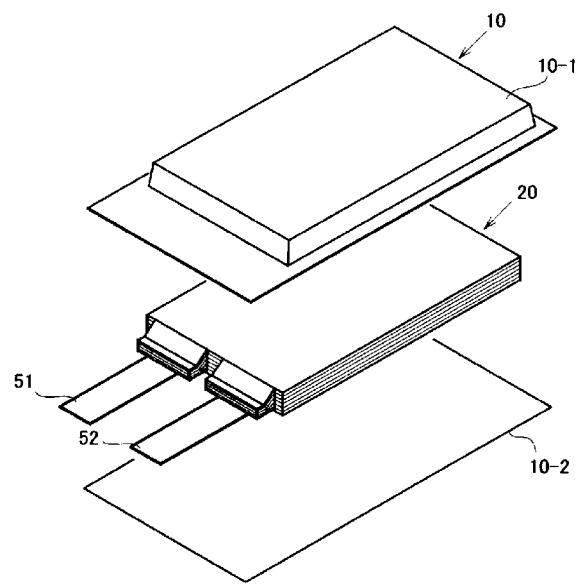
FIG. 1 is an exploded perspective view showing a basic structure of a film package battery.

Hereinafter, one example of the lithium ion secondary battery of the present embodiment will be described for each component.

Electrolyte Solution

The electrolyte solution according to the present embodiment comprises an open chain sulfone compound, a fluorinated cyclic carbonate and an open chain carbonate as electrolyte solvents, and $LiN(FSO_2)_2$ (lithium bis(fluorosulfonyl)imide, hereinafter, this is also referred to as "LiFSI") as a supporting salt.

The open chain sulfone compound is preferably represented by the following formula (1).

$$R_1"-SO_2-R_2" \quad (1)$$

In formula (1), $R_1"$ and $R_2"$ each independently represent a substituted or unsubstituted alkyl group.

In formula (1), the carbon number n1 of $R_1"$ and the carbon number n2 of $R_2"$ are each independently and preferably $1 \leq n1 \leq 6$ and $1 \leq n2 \leq 6$, more preferably $1 \leq n1 \leq 5$ and $1 \leq n2 \leq 5$, and further preferably $1 \leq n1 \leq 4$ and $1 \leq n2 \leq 4$. The alkyl group includes linear alkyl group and branched alkyl group.

At least part of hydrogens of the alkyl groups represented by $R_1"$ and $R_2"$ may be replaced by a halogen atom (for example, chlorine atom, bromine atom and fluorine atom).

The open chain sulfone compound is not particularly limited, but examples thereof include dimethyl sulfone, ethyl methyl sulfone, diethyl sulfone, butyl methyl sulfone, dibutyl sulfone, methyl isopropyl sulfone, diisopropyl sulfone, methyl tert-butyl sulfone, butyl ethyl sulfone, butyl propyl sulfone, butyl isopropyl sulfone, di-tert-butyl sulfone, diisobutyl sulfone, ethyl isopropyl sulfone, ethyl isobutyl sulfone, tert-butyl ethyl sulfone, propyl ethyl sulfone, isobutyl isopropyl sulfone, butyl isobutyl sulfone and isopropyl (1-methyl-propyl) sulfone. Among these, at least one selected from dimethyl sulfone, ethyl methyl sulfone, diethyl sulfone, methyl isopropyl sulfone, and ethyl isopropyl sulfone is preferred because the molecular weight is small and the viscosity of the solvent is low.

These open chain sulfone compounds may be used singly or in combination of two or more thereof.

The open chain sulfone compounds have a characteristic that the dielectric constant is comparatively high, facilitate dissociation of a supporting salt and have the effect of increasing the electrical conductivity of the electrolyte solution. Also, the open chain sulfone compounds have a characteristic that gas is less generated even at a high temperature operation because of high oxidation resistance. On the other hand, since the open chain sulfone compounds have high viscosity, if the concentration thereof is excessively high, ion conductivity conversely decreases, and the open chain sulfone compounds may precipitate in the electrolytic solution in some cases. For these reasons, the content of the open chain sulfone compound in the electrolyte solvent is preferably 5 volume % or more, more preferably 10 volume % or more, and still more preferably 15 volume % or more. The content of the open chain sulfone compound in the electrolyte solvent is preferably 80 volume % or less, more preferably 60 volume % or less, and still more preferably 40 volume % or less.

The open chain carbonate is not especially limited, but examples thereof include dimethyl carbonate (DMC), ethyl methyl carbonate (EMC), diethyl carbonate (DEC) and dipropyl carbonate (DPC). In addition, the open chain carbonate includes fluorinated open chain carbonates. Examples of the fluorinated open chain carbonate include compounds having structures in which a part or the whole of hydrogen atoms of ethyl methyl carbonate (EMC), dimethyl carbonate (DMC), diethyl carbonate (DEC), dipropyl carbonate (DPC) or the like is substituted by a fluorine atom(s). Examples of the fluorinated open chain carbonate include bis(fluoroethyl) carbonate, 3-fluoropropyl methyl carbonate, 3,3,3-trifluoropropyl methyl carbonate, 2,2,2-trifluoroethyl methyl carbonate, 2,2,2-trifluoroethyl ethyl carbonate, monofluoromethyl methyl carbonate, methyl 2,2,3,3-tetrafluoropropyl carbonate, ethyl 2,2,3,3-tetrafluoropropyl carbonate, bis(2,2,3,3-tetrafluoropropyl) carbonate, bis(2,2,2-trifluoroethyl) carbonate, 1-monofluoroethyl ethyl carbonate, 1-monofluoroethyl methyl carbonate, 2-monofluoroethyl methyl carbonate, bis(1-monofluoroethyl) carbonate, bis(2-monofluoroethyl) carbonate and bis(monofluoromethyl) carbonate. The open chain carbonates can be used singly or concurrently in two or more.

The open chain carbonate, in the case where the number of carbon atoms of substituents added to the "—OCOO—" structure is small, has an advantage of the viscosity being low. On the other hand, when the number of carbon atoms is too large, the viscosity of the electrolyte solution becomes high and the electroconductivity of Li ions is reduced in some cases. For these reasons, the total number of carbon atoms of two substituents added to the "—OCOO—" structure of the open chain carbonate is preferably 2 or more and 6 or less.

The open chain carbonate has an effect of reducing the viscosity of the electrolyte solution, and can raise the electroconductivity of the electrolyte solution. From these viewpoints, the content of the open chain carbonate in the electrolyte solvent is preferably 5 volume % or more, more preferably 20 volume % or more, and still more preferably 40 volume % or more. The content of the open chain carbonate in the electrolyte solvent is preferably 90 volume % or less, more preferably 80 volume % or less, and still more preferably 70% volume % or less.

Examples of the fluorinated cyclic carbonate include compounds in which a part or the whole of hydrogen atoms of ethylene carbonate (EC), propylene carbonate (PC), butylene carbonate (BC) or the like is substituted by a fluorine atom(s). Examples thereof include 4-fluoro-1,3-dioxolan-2-one (FEC), in which one hydrogen atom of ethylene carbonate (EC) is substituted by fluorine; (cis or trans-)4,5-difluoro-1,3-dioxolan-2-one and 4,4-difluoro-1,3-dioxolan-2-one, in which two of them are substituted by fluorine; 4,4,5,5-tetrafluoro-1,3-dioxolan-2-one, in which four of them are substituted by fluorine; 4-fluoromethyl-1,3-dioxolan-2-one, 4-fluoro-5-methyl-1,3-dioxolan-2-one, and 4-fluoro-4-methyl-1,3-dioxolan-2-one, in which one hydrogen of propylene carbonate (PC) is substituted by fluorine; and 3,3,3-trifluoroproplene carbonate (FPC), in which three of them are substituted by fluorine.

The content of the fluorinated cyclic carbonate in the electrolyte solvent is not particularly limited, but is preferably 0.1 volume % or more and 20 volume % or less. When the content of the fluorinated cyclic carbonate in the electrolyte solvent is 0.1 volume % or more, the effect of suppressing a reaction between an electrolyte solution and a negative electrode is increased. That is, cycle characteristics are improved. Also, when the content of the fluorinated cyclic carbonate in the electrolyte solvent is 20 volume % or less, gas generation caused by a decomposition reaction of the fluorinated cyclic carbonate can be reduced. The content of the fluorinated cyclic carbonate in the electrolyte solvent is more preferably 1 volume % or more, and still more preferably 2 volume % or more. The content of the fluorinated cyclic carbonate in the electrolyte solvent is more preferably 10 volume % or less, and still more preferably 5 volume % or less.

The electrolyte solvent preferably comprises the open chain sulfone compound, the fluorinated cyclic carbonate and the open chain carbonate as main components. The ratio of the total amount of the open chain sulfone compound, the fluorinated cyclic carbonate and the open chain carbonate in the electrolyte solvent is preferably 50 volume % or more, more preferably 60 volume % or more, and still more preferably 70 volume % or more. The ratio of the total amount of the open chain sulfone compound, the fluorinated cyclic carbonate and the open chain carbonate in the electrolyte solvent is preferably 99 volume % or less, more preferably 95 volume % or less, and still more preferably 90 volume % or less.

In addition to the open chain sulfone compound, the fluorinated cyclic carbonate and the open chain carbonate, the electrolyte solution may comprise other electrolyte solvents. Examples of a preferred electrolyte solvent include fluorinated ethers and cyclic carbonates other than the fluorinated cyclic carbonate.

The fluorinated ether preferably has a structure of the following formula (2).

$$R_1\text{—}O\text{—}R_2 \qquad (2)$$

In formula (2), $R_1$ and $R_2$ are each independently an alkyl group, and at least one of $R_1$ and $R_2$ is a fluorine-containing alkyl group.

The carbon number of the alkyl group represented by $R_1$ or $R_2$ is preferably 1 to 5, and more preferably 1 to 3.

$R_1$ and $R_2$ may have a substituent, and examples of the substituent include alkyl group having 1 to 6 carbon atoms (for example, methyl group, ethyl group, propyl group, isopropyl group, butyl group, isobutyl group), aryl group having 6 to 10 carbon atoms (for example, phenyl group, naphthyl group), halogen atoms (for example, chlorine atom, bromine atom, fluorine atom) and the like.

Examples of the fluorinated ether include 2,2,3,3,3-pentafluoropropyl 1,1,2,2-tetrafluoroethyl ether, 1,1,2,2-tetrafluoroethyl 2,2,2-trifluoroethyl ether, 1H, 1H, 2'H, 3H-decafluorodipropyl ether, 1,1,2,3,3,3-hexafluoropropyl 2,2-difluoroethyl ether, isopropyl 1,1,2,2-tetrafluoroethyl ether, propyl 1,1,2,2-tetrafluoroethyl ether, 1,1,2,2-tetrafluoroethyl 2,2,3,3,3-tetrafluoropropyl ether, 1H, 1H, 5H-perfluoropentyl 1,1,2,2-tetrafluoroethyl ether, 1H-perfluorobutyl 1H-perfluoroethyl ether, methyl perfluoropentyl ether, methyl perfluorohexyl ether, methyl 1,1,3,3,3-pentafluoro-2-(trifluoromethyl)propyl ether, 1,1,2,3,3,3-hexafluoropropyl 2,2,2-trifluoroethyl ether, ethyl nonafluorobutyl ether, ethyl 1,1,2,3,3,3-hexafluoropropyl ether, 1H, 1H, 5H-octafluoropentyl 1,1,2,2-tetrafluoroethyl ether, 1H, 1H, 2'H-perfluorodipropyl ether, heptafluoropropyl 1,2,2,2-tetrafluoroethyl ether, methyl nonafluorobutyl ether, 1,1-difluoroethyl 2,2,3,3-tetrafluoropropyl ether, bis(2,2,3,3-tetrafluoropropyl) ether, 1,1-difluoroethyl 2,2,3,3,3-pentafluoropropyl ether, 1,1-difluoroethyl 1H,1H-heptafluorobutyl ether, 2,2,3,4,4,4-hexafluorobutyl difluoromethyl ether, bis(2,2,3,3,3-pentafluoropropyl) ether, nonafluorobutyl methyl ether, bis(1H,1H-heptafluorobutyl) ether, 1,1,2,3,3,3-hexafluoropropyl 1H,1H-heptafluorobutyl ether, 1H,1H-heptafluorobutyl trifluoromethyl ether, 2,2-difluoroethyl 1,1,2,2-tetrafluoroethyl ether, bis(trifluoroethyl) ether, bis(2,2-difluoroethyl) ether, bis(1,1,2-trifluoroethyl) ether, 1,1,2-trifluoroethyl 2,2,2-trifluoroethyl ether and the like.

Among these, from the viewpoint of voltage resistance and boiling point, at least one selected from 1,1,2,2-tetrafluoroethyl 2,2,3,3-tetrafluoropropyl ether, 2,2,3,4,4,4-hexafluorobutyl difluoromethyl ether, 1,1-difluoroethyl 2,2,3,3-tetrafluoropropyl ether, 1,1,2,3,3,3-hexafluoropropyl 2,2-difluoroethyl ether, 1,1-difluoroethyl 1H,1H-heptafluorobutyl ether, 1H,1H,2'H,3H-decafluorodipropyl ether, bis(2,2,3,3,3-pentafluoropropyl)ether, 1H,1H,5H-perfluoropentyl 1,1,2,2-tetrafluoroethyl ether, bis(1H,1H-heptafluorobutyl)ether, 1H,1H,2'H-perfluorodipropyl ether, 1,1,2,3,3,3-hexafluoropropyl 1H,1H-heptafluorobutyl ether, 1H-perfluorobutyl 1H-perfluoroethyl ether, and bis(2,2,3,3-tetrafluoropropyl)ether is preferred.

The content of the fluorinated ether in the electrolyte solvent is preferably 0.1 volume % or more, more preferably 1 volume % or more, and still more preferably 3 volume % or more. Containing too small of the fluorinated ether may result in an increase in the viscosity of the electrolyte solution, leading to a decrease in the electroconductivity and a drop in capacity in some cases. The content of the fluorinated ether in the electrolyte solvent is preferably 30 volume % or less, more preferably 20 volume % or less, and still more preferably less than 5 volume %. Containing too much of the fluorinated ether induces a decrease in the dielectric constant of the electrolyte solution, and thereby the supporting salt becomes impossible to dissociate, leading to a drop in capacity in some cases. In one embodiment, good battery characteristics can be provided when the electrolyte solution does not comprises the fluorinated ether.

Examples of the cyclic carbonate other than the fluorinated cyclic carbonate may include, but not particularly limited to, ethylene carbonate (EC), propylene carbonate (PC), butylene carbonate (BC), vinylene carbonate (VC) and the like. The content of the cyclic carbonate other than the fluorinated cyclic carbonate in the electrolyte solvent is, from the viewpoint of an effect of enhancing the degree of dissociation of the supporting salt and an effect of enhancing the electroconductivity of the electrolyte solution, preferably 0.1 volume % or more, more preferably 0.5 volume % or more, and still more preferably 1 volume % or more. Also, the content of the cyclic carbonate other than the fluorinated cyclic carbonate in the electrolyte solvent is preferably 30 volume % or less, more preferably 20 volume % or less, and still more preferably 15 volume % or less.

The electrolyte solution comprises $LiN(FSO_2)_2$ as a supporting salt. The lower limit of the concentration of LiN $(FSO_2)_2$ in the electrolyte solution is preferably 0.2 mol/L or more, more preferably 0.4 mol/L or more, and still more preferably 0.6 mol/L or more. When the electrolyte solution comprises 0.2 mol/L or more of $LiN(FSO_2)_2$, life characteristics of the lithium ion secondary battery are further improved. In addition, when the electrolyte solution comprises 0.2 mol/L or more of $LiN(FSO_2)_2$, the amount of gas generation in the battery is reduced. The upper limit of the concentration of $LiN(FSO_2)_2$ in the electrolyte solution is preferably 5 mol/L or less, more preferably 3 mol/L or less, and still more preferably 1.5 mol/L or less. When LiN $(FSO_2)_2$ is contained within such a range, life characteristics of the battery may be improved.

The electrolyte solution preferably comprises $LiPF_6$ in addition to $LiN(FSO_2)_2$ as supporting salts. When the electrolyte solution comprises a small amount of $LiPF_6$, life characteristics of the battery may be improved. The upper limit of the ratio of $LiN(FSO_2)_2$ with respect to the total amount of $LiPF_6$ and $LiN(FSO_2)_2$ is preferably 95 mol % or less and more preferably 90 mol % or less.

$LiPF_6$ is a supporting salt generally used in a lithium ion secondary battery, but reacts with water to generate hydrogen fluoride (HF), which may be a problem in some cases. The hydrogen fluoride generated in a battery may decompose an electrolyte solvent. Decomposition products caused by this are deposited on the surface of a negative electrode active material such as the silicon material. Also, the hydrogen fluoride may corrode the surface of the silicon material used as the active material. A silicon material with a surface on which the decomposition products are deposited or with a corroded surface is deactivated. As a result, a reaction amount with Li is intensively increased on a portion which is not deactivated, and thereby the silicon material expands, losing its electrical contact. The deterioration of the negative electrode active material, especially the silicon material, which is considered to be caused by $LiPF_6$, can be suppressed by replacing at least a portion of the normal used amount of $LiPF_6$ by $LiN(FSO_2)_2$. The lower limit of the ratio of $LiN(FSO_2)_2$ with respect to the total amount of $LiPF_6$ and $LiN(FSO_2)_2$ is preferably 50 mol % or more and more preferably 60 mol % or more.

Other supporting salts may be used in combination with $LiN(FSO_2)_2$ in the electrolyte solution. Examples of other supporting salts include, but are not particularly limited to, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_3$, $LiN(CF_3SO_2)_2$, $LiN(C_2F_5SO_2)_2$, $LiB_{10}Cl_{10}$, lithium lower aliphatic carboxylates, chloroborane lithium, lithium tetraphenylborate, LiBr, LiI, LiSCN, LiCl and the like.

Negative Electrode

The negative electrode comprises a current collector and a negative electrode active material layer which is provided on the current collector and comprises a negative electrode active material, a negative electrode binder and optionally a conductive assisting agent.

The negative electrode active material comprises a material comprising silicon as a constituent element (hereinafter, also referred to as a silicon material). Examples of the silicon material include metal silicon, alloys comprising silicon, silicon oxides denoted by the composition formula, $SiO_x$ ($0<x\leq2$). The other metals used in the alloys comprising silicon are preferably selected from the group consisting of Li, Al, Ti, Pb, Sn, In, Bi, Ag, Ba, Ca, Hg, Pd, Pt, Te, Zn and La. The particle surface of the silicon material may be coated with carbon. The carbon coating may improve cycle characteristics. The carbon coating may be formed by a sputtering method, a vapor deposition method and the like, using a carbon source. The silicon materials are known as active materials having a large capability of absorbing and releasing lithium ions per unit volume. Therefore, a battery having a high silicon material content may have high energy density.

When the silicon oxide or the alloy comprising silicon, among the silicon materials, is used as the negative electrode active material, a battery having better cycle characteristics may be provided. In particular, the silicon oxide is preferred.

The silicon material may be used in combination with another negative electrode active material. In particular, the silicon material is preferably used in combination with carbon. The carbon can reduce the influence of the expansion and contraction and can improve cycle characteristics of the battery. Examples of the carbon include graphite, amorphous carbon, graphene, diamond-like carbon, carbon nanotube, and composites thereof. Here, highly crystalline graphite is highly electroconductive, and has excellent adhesion to a negative electrode current collector composed of a metal such as copper as well as voltage flatness. On the other hand, low-crystallinity amorphous carbon shows relatively small volume expansion, is thus highly effective in lessening the volume expansion of the entire negative electrode, and is unlikely to undergo degradation resulting from non-uniformity such as grain boundaries and defects.

The amount of the silicon material is preferably 5 weight % or more, more preferably 50 weight % or more, particularly preferably 70 weight % or more and may be 100 weight %, with respect to the total amount of the negative electrode active material. A film capable of suppressing the decomposition of the electrolyte solution tends to be formed on the silicon material. In addition, the i effect of improving battery life characteristics derived from LiFSI used as a supporting salt is remarkable in the case of the silicon materials. The negative electrode active material is a material capable of absorbing and releasing lithium. Herein, the negative electrode active material does not include materials not absorbing and releasing lithium, for example, binders.

The negative electrode binder is not particularly limited, and polyvinylidene fluoride, vinylidene fluoride-hexafluoropropylene copolymer, vinylidene fluoride-tetrafluoroethylene copolymer, polytetrafluoroethylene, polypropylene, polyethylene, polybutadiene, polyacrylic acid, polyacrylic ester, polystyrene, polyacrylonitrile, polyimide, polyamide-imide or the like may be used. Also, the negative electrode binder includes mixtures, copolymers or cross-linked bodies of a plurality of the above resins, for example, styrene butadiene rubber (SBR). When an aqueous negative electrode binder such as an SBR emulsion is used, a thickener such as carboxymethyl cellulose (CMC) can also be used.

To improve cycle characteristics, the polyacrylic acid and polyimide, among the above negative electrode binders, are preferred, and the polyacrylic acid is more preferred.

The polyacrylic acid may be a polymer comprising a monomer unit derived from a (meth)acrylic acid represented by the following formula (3) or a metal salt thereof. Herein, the term "(meth)acrylic acid" means acrylic acid and methacrylic acid.

(3)

In formula (3), $R^1$ is a hydrogen atom or a methyl group.

The carboxylic acid in a monomer unit represented by formula (3) may be a carboxylic acid metal salt. The metal is preferably a monovalent metal. Examples of the monovalent metal include alkali metals (for example, Na, Li, K, Rb, Cs, Fr and the like) and precious metals (for example, Ag, Au, Cu and the like). Among these, alkali metals are preferred. As the alkali metals, Na, Li and K are preferred, and Na is most preferred. When the polyacrylic acid contains the carboxylic acid salt at least in part, adhesiveness to constituent materials of the active material layer may be further improved in some cases.

The polyacrylic acid may comprise other monomer units. When the polyacrylic acid further comprises monomer units other than the (meth)acrylic acid monomer units, the peel strength between the active material layer and the current collector may be improved in some cases. Examples of other monomer units include monomer units derived from monomers, such as acids having ethylenically unsaturated group, for example, monocarboxylic acid compounds such as crotonic acid and pentenoic acid, dicarboxylic acid compounds such as itaconic acid and maleic acid, sulfonic acid compounds such as vinylsulfonic acid, and phosphonic acid compounds such as vinylphosphonic acid; aromatic olefins having acidic group such as styrene sulfonic acid and styrene carboxylic acid; (meth)acrylic acid alkyl esters; acrylonitrile; aliphatic olefins such as ethylene, propylene, and butadiene; aromatic olefins such as styrene; and the like. In addition, other monomer units may be monomer units constituting a known polymer that is used as a binder for a secondary battery. If present, acids may be also replaced with their salts in these monomer units.

In addition, in the polyacrylic acid according to present embodiment, at least one hydrogen atom in a main chain and a side chain may be substituted by halogen (fluorine, chlorine, boron, iodine, etc.) or the like.

When the polyacrylic acid according to present embodiment is a copolymer containing two or more types of monomer units, the copolymer may be a random copolymer, an alternating copolymer, a block copolymer, a graft copolymer or combinations thereof.

The polyimide may be a polymer comprising a monomer unit represented by the following formula (4).

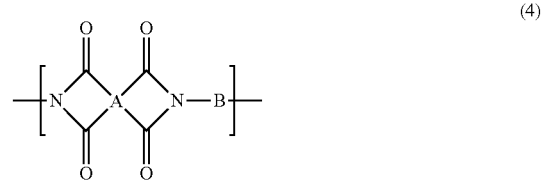

(4)

In formula (4), A represents a tetravalent group of a tetracarboxylic acid dianhydride, from which acid anhydride groups have been removed, and B represents a divalent group of a diamine, from which amino groups have been removed.

The tetracarboxylic acid dianhydrides and the diamines are generally used as polyimide raw materials. The tetracarboxylic acid dianhydride and the diamine condense to form imide group of formula (4).

The polyimide is not particularly limited, and commercially available polyimide may be used. Examples of the tetracarboxylic acid dianhydride for forming A of formula (4) include aromatic tetracarboxylic acid dianhydrides, such as 3,3',4,4'-biphenyltetracarboxylic dianhydride, pyromellitic dianhydride, 3,4'-oxydiphthalic anhydride, 4,4'-oxydiphthalic anhydride and 3,3',4,4'-benzophenonetetracarboxylic dianhydride; and aliphatic tetracarboxylic acid dianhydrides, such as cyclobutanetetracarboxylic dianhydride, 1,2,3,4-cyclopentanetetracarboxylic dianhydride, 1,2,4,5-cyclohexanetetracarboxylic dianhydride, bicyclo[2.2.1]heptane-2,3,5,6-tetracarboxylic dianhydride and 1,2,3,4-butanetetracarboxylic dianhydride. Examples of the diamine for forming B of formula (4) include aromatic diamines, such as p-phenylenediamine, m-phenylenediamine, p-xylylenediamine and m-xylylenediamine; and aliphatic diamines, such as cyclohexanediamine, di(aminomethyl)cyclohexane, diaminomethylbicycloheptane, and diaminomethyloxybicycloheptane.

The polyimide binder may comprise an imidization promotor, which promotes the reaction of a polyamic acid that is a precursor to a polyimide.

The lower limit of the amount of the negative electrode binder is preferably 1 part by weight or more, and more preferably 2 parts by weight or more, and the upper limit is preferably 30 parts by weight or less, and more preferably 25 parts by weight or less, based on 100 parts by weight of the negative electrode active material.

From the viewpoint of improving the conductivity, the negative electrode may comprise a conductive assisting agent, for example, carbon, such as carbonaceous fine particles of graphite, carbon black, acetylene black and the like.

As the negative electrode current collector, from the viewpoint of electrochemical stability, aluminum, nickel, stainless steel, chrome, copper, silver, or an alloy thereof may be used. As the shape thereof, foil, flat plate, mesh and the like are exemplified.

The negative electrode according to the present embodiment may be prepared, for example, by preparing a slurry comprising the negative electrode active material, the conductive assisting agent, the negative electrode binder and a solvent, and applying this to the negative electrode current collector to form the negative electrode active material layer. Examples of a method for forming the negative electrode active material layer include a doctor blade method, a die coater method, a CVD method, a sputtering method, and the like. After forming the negative electrode active material layer in advance, a thin film of aluminum, nickel or an alloy thereof as a positive electrode current collector may be formed thereon by a method such as vapor deposition or sputtering, to prepare a negative electrode.

Positive Electrode

The positive electrode comprises a current collector and a positive active material layer comprising a positive electrode active material, a positive electrode binder and optionally a conductive assisting agent.

The positive electrode active material may be selected from several viewpoints. In terms of achieving high energy density, it is preferable to contain a high capacity compound. Examples of the high capacity compound include lithium nickelate ($LiNiO_2$) and lithium nickel composite oxides in which a part of Ni of lithium nickelate is replaced by another metal element, and layered lithium nickel composite oxides represented by the following formula (C) are preferred.

$$Li_yNi_{(1-x)}M_xO_2 \tag{C}$$

wherein $0 \le x < 1$, $0 < y \le 1.2$, and M is at least one element selected from the group consisting of Co, Al, Mn, Fe, Ti, and B.

From the viewpoint of high capacity, it is preferred that the content of Ni is high, that is, x is less than 0.5, further preferably 0.4 or less in the formula (C). Examples of such compounds include $Li_\alpha Ni_\beta Co_\gamma Mn_\delta O_2$ ($0 < \alpha \le 1.2$, preferably $1 \le \alpha \le 1.2$, $\beta+\gamma+\delta=1$, $\beta \ge 0.7$, and $\gamma \le 0.2$) and $Li_\alpha Ni_\beta Co_{65} Al_\delta O_2$ ($0 < \alpha \le 1.2$, preferably $1 \le \alpha \le 1.2$, $\beta+\gamma+\delta=1$, $\beta \ge 0.6$, preferably ($\beta 0.7$, and $\gamma \le 0.2$) and particularly include $LiNi_\beta Co_\gamma Mn_\delta O_2$ ($0.75 \le \beta \le 0.85$, $0.05 \le \gamma \le 0.15$, and $0.10 \le \delta \le 0.20$). More specifically, for example, $LiNi_{0.8}Co_{0.5}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$ may be preferably used.

From the viewpoint of thermal stability, it is also preferred that the content of Ni does not exceed 0.5, that is, x is 0.5 or more in the formula (C). In addition, it is also preferred that particular transition metals do not exceed half. Examples of such compounds include $Li_\alpha Ni_\beta Co_\gamma Mn_\delta O_2$ ($0 < \alpha \le 1.2$, preferably $1 \le \alpha \le 1.2$, $\beta+\gamma+\delta=1$, $0.2 \le \beta \le 0.5$, $0.1 \le \gamma \le 0.4$, and $0.1 \le \delta \le 0.4$). More specific examples may include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (also including those in which the content of each transition metal fluctuates by about 10% in these compounds).

In addition, two or more compounds represented by the formula (C) may be mixed and used, and, for example, it is also preferred that NCM532 or NCM523 and NCM433 are mixed in the range of 9:1 to 1:9 (as a typical example, 2:1) and used. Further, by mixing a material in which the content of Ni is high (x is 0.4 or less in the formula (C)) and a material in which the content of Ni does not exceed 0.5 (x is 0.5 or more, for example, NCM433), a battery having high capacity and high thermal stability can also be formed.

Examples of the positive electrode active materials other than the above include lithium manganate having a layered structure or a spinel structure such as $LiMnO_2$, $Li_xMn_2O_4$ ($0 < x < 2$), $Li_2MnO_3$, $xLi2MnO_3-(1-x)LiMO_2$ ($0.1 < x < 0.8$, M is one or more elements selected from the group consisting of Mn, Fe, Co, Ni, Ti, Al and Mg) and $Li_xMn_{1.5}Ni_{0.5}O_4$ ($0 < x < 2$); $LiCoO_2$ or materials in which a part of the transition metal in this material is replaced by other metal(s); materials in which Li is excessive as compared with the stoichiometric composition in these lithium transition metal oxides; materials having olivine structure such as $LiFePO_4$; and the like. In addition, materials in which these metal oxides are partially substituted by Al, Fe, P, Ti, Si, Pb, Sn, In, Bi, Ag, Ba, Ca, Hg, Pd, Pt, Te, Zn, La or the like are also usable. The positive electrode active materials described above may be used alone or in combination of two or more.

The positive electrode binder is not particularly limited, and polyvinylidene fluoride, vinylidene fluoride-hexafluoropropylene copolymer, vinylidene fluoride-tetrafluoroethylene copolymer, polytetrafluoroethylene, polypropylene, polyethylene, polybutadiene, polyacrylic acid, polyacrylic ester, polystyrene, polyacrylonitrile, polyimide, polyamide-imide and the like may be used. Also, the positive electrode binder may be a mixture, a copolymer or a cross-linked body of a plurality of the above resins, for example, styrene butadiene rubber (SBR). When an aqueous positive electrode binder such as an SBR emulsion is used, a thickener such as carboxymethyl cellulose (CMC) can also be used. The lower limit of the amount of the positive electrode binder is preferably 1 part by weight or more, and more preferably 2 parts by weight or more, and the upper limit is preferably 30 parts by weight or less, and more preferably 25 parts by weight or less, based on 100 parts by weight of the positive electrode active material.

For the positive electrode active material layer, a conductive assisting agent may be added for the purpose of lowering the impedance. Examples of the conductive assisting agent include, flake-like, soot, and fibrous carbon fine particles and the like, for example, graphite, carbon black, acetylene black, vapor grown carbon fibers and the like.

As the positive electrode current collector, from the view point of electrochemical stability, aluminum, nickel, copper, silver, and alloys thereof are preferred. As the shape thereof, foil, flat plate, mesh and the like are exemplified. In particular, a current collector using aluminum, an aluminum alloy, or iron-nickel-chromium-molybdenum based stainless steel is preferable.

The positive electrode may be prepared by forming the positive electrode active material layer comprising the positive electrode active material and the positive electrode binder on the positive electrode current collector. Examples of a method of forming the positive electrode active material layer include a doctor blade method, a die coater method, a CVD method, a sputtering method, and the like. It is also possible that after forming the positive electrode active material layer in advance, a thin film of aluminum, nickel or an alloy thereof as a positive electrode current collector is formed thereon by a method such as vapor deposition or sputtering, to prepare a positive electrode.

Separator

The separator may be of any type as long as it has durability against the electrolyte solution. Specific examples of a material thereof include polyolefins such as polypropylene and polyethylene, cellulose, polyethylene terephthalate, polyimide, polyvinylidene fluoride, aromatic polyamides (aramid) such as polymetaphenylene isophthalamide, polyparaphenylene terephthalamide and copolyparaphenylene 3,4'-oxydiphenylene terephthalamide, and the like. These can be used as porous films, woven fabrics, nonwoven fabrics or the like.

Insulation Layer

An insulation layer may be formed on a surface of the positive electrode, the negative electrode and the separator. Examples of a method for forming the insulation layer include a doctor blade method, a die coater method, a CVD method, a sputtering method, and the like. The insulation layer may be formed at the same time as forming the positive electrode, negative electrode or separator. Materials constituting the insulation layer include a mixture of an insulating filler such as aluminum oxide or barium titanate and a binder such as SBR or polyvinylidene fluoride.

Structure of Secondary Battery

Figure 2:
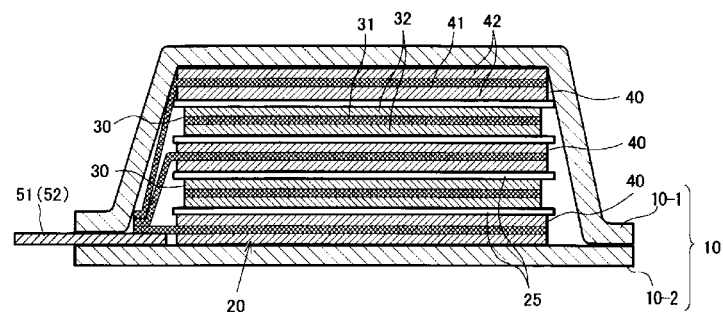
FIG. 2 is a cross-sectional view schematically showing a cross section of the battery of FIG. 1.

The lithium ion secondary battery according to the present embodiment may have, for example, a structure as shown in FIGS. 1 and 2. This lithium ion secondary battery comprises a battery element 20, a film outer package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 2. In the positive electrode 30, an electrode material 32 is applied to both surfaces of a metal foil 31, and also in the negative electrode 40, an electrode material 42 is applied to both surfaces of a metal foil 41 in the same manner. The present invention is not necessarily limited to stacking type batteries and may also be applied to batteries such as a winding type.

As shown in FIGS. 1 and 2, the lithium ion secondary battery according to the present embodiment may have an arrangement in which the electrode tabs are drawn out to one side of the outer package, but the electrode tab may be drawn out to both sides of the outer package. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 2). The portion in which the extended portions are brought together into one in the stacking direction in this manner is also referred to as a "current collecting portion" or the like.

The film outer package 10 is composed of two films 10-1 and 10-2 in this example. The films 10-1 and 10-2 are heat-sealed to each other in the peripheral portion of the battery element 20 and hermetically sealed. In FIG. 1, the positive electrode tab 51 and the negative electrode tab 52 are drawn out in the same direction from one short side of the film outer package 10 hermetically sealed in this manner.

Of course, the electrode tabs may be drawn out from different two sides respectively. In addition, regarding the arrangement of the films, in FIG. 1 and FIG. 2, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

Method for Manufacturing Secondary Battery

The secondary battery according to the present embodiment can be manufactured by a conventional method. An example of a method for manufacturing a secondary battery will be described taking a stacked laminate type secondary battery as an example. First, in the dry air or an inert atmosphere, the positive electrode and the negative electrode are placed to oppose to each other via a separator to form an electrode element. Next, this electrode element is accommodated in an outer package (container), an electrolyte solution is injected, and the electrodes are impregnated with the electrolyte solution. Thereafter, the opening of the outer package is sealed to complete the secondary battery.

Assembled Battery

A plurality of the secondary batteries according to the present embodiment may be combined to form an assembled battery. The assembled battery may be configured by connecting two or more secondary batteries according to the present embodiment in series or in parallel or in combination of both. The connection in series and/or parallel makes it possible to adjust the capacitance and voltage freely. The number of the secondary batteries included in the assembled battery can be set appropriately according to the battery capacity and output.

Vehicle

The secondary battery or the assembled battery according to the present embodiment can be used in vehicles. Vehicles according to the present embodiment include hybrid vehicles, fuel cell vehicles, electric vehicles (besides four-wheel vehicles (cars, commercial vehicles such as trucks and buses, light automobiles, etc.), two-wheeled vehicle (bike) and tricycle), and the like. The vehicles according to the present embodiment are not limited to automobiles, and it may be a variety of power source of other vehicles, such as a moving body like a train.

EXAMPLES

Negative Electrode

In Examples 1 to 11 and Comparative examples 1 to 5, SiO/C was used as a negative electrode active material, and a polyimide was used as a negative electrode binder. The SiO/C was a silicon oxide having carbon coating (weight ratio: silicon oxide/carbon=95/5). Also, acetylene black was used as a conductive assisting agent. The SiO/C, acetylene black and a polyamic acid were respectively weighed at a weight ratio of 80:5:15. These were mixed with N-methylpyrrolidone to prepare a negative electrode slurry. The negative electrode slurry was applied to a 10 μm-thick stainless steel foil, dried and further heat-treated at 300° C. under vacuum, and then a negative electrode was completed.

In Comparative examples 6 and 7, graphite was used as a negative electrode active material, and a polyacrylic acid was used as a negative electrode binder. Also, acetylene black was used as a conductive assisting agent. The graphite, acetylene black and polyacrylic acid were respectively weighed at a weight ratio of 80:5:15. These were mixed with water to prepare a negative electrode slurry. The negative electrode slurry was applied to a 10 μm-thick copper foil and dried, and then a negative electrode was completed.

Positive Electrode $LiNi_{0.8}Co_{0.15}Al_{0.05}O_2$ was used as a positive electrode active material. This positive electrode active material, carbon black as a conductive assisting agent, and polyvinylidene fluoride as a positive electrode binder were weighed at a weight ratio of 90:5:5. These were mixed with N-methylpyrrolidone to prepare a positive electrode slurry. The positive electrode slurry was applied to a 20 μm-thick aluminum foil, dried and further pressed, and then a positive electrode was completed.

Electrode Stack

The fabricated three layers of the positive electrodes and four layers of the negative electrodes were stacked alternately with an aramid porous film as a separator sandwiched therebetween. The end portions of the positive electrode current collectors that were not covered with the positive electrode active material and the end portions of the negative electrode current collectors that were not covered with the negative electrode active material were welded individually. Further, to the welding positions, an aluminum positive electrode terminal and a nickel negative electrode terminal were welded respectively, to obtain an electrode stack having a planar stacked structure.

Electrolyte Solution

In each example, ethylene carbonate, fluoroethylene carbonate, a sulfone compound, an open chain carbonate and another solvent were mixed at a volume ratio described in Table 1 to prepare an electrolyte solvent respectively. Herein, the volume of each compound was calculated from weight and density at room temperature, and the volume ratio of a solvent was adjusted based on this. $LiPF_6$ and $LiN(FSO_2)_2$ (LiFSI) as supporting salts were added to the prepared electrolyte solvent so as to have concentrations presented in Table 1, and an electrolyte solution used in each example was prepared. Abbreviations in Table 1 represent the following solvents.

EC: ethylene carbonate
FEC: fluoroethylene carbonate
EMS: ethyl methyl sulfone
DMS: dimethyl sulfone
SL: sulfolane
DEC: diethyl carbonate
FDEC: bis(2,2,2-trifluoroethyl) carbonate
FMPC: methyl 2,2,3,3-tetrafluoropropyl carbonate
FE1: 1,1,2,2-tetrafluoroethyl 2,2,3,3-tetrafluoropropyl ether

TABLE 1

| | Negative electrode active material | $LiPF_6$ mol/L | LiFSI mol/L | EC conc. vol % | FEC conc. vol % | Sulfone compound Compound | vol % | Open chain carbonate Compound | vol % | Another solvent Compound | vol % |
|---|---|---|---|---|---|---|---|---|---|---|---|
| Example 1 | SiO/C | 0.4 | 0.8 | 10 | 5 | EMS | 15 | DEC | 70 | — | — |
| Example 2 | SiO/C | 0.4 | 0.8 | 10 | 5 | DMS | 15 | DEC | 70 | — | — |
| Example 3 | SiO/C | 0.4 | 0.8 | 0 | 5 | EMS | 25 | DEC | 70 | — | — |
| Example 4 | SiO/C | 0.4 | 0.8 | 0 | 5 | EMS | 55 | DEC | 40 | — | — |
| Example 5 | SiO/C | 0.4 | 0.8 | 5 | 10 | EMS | 15 | DEC | 70 | — | — |
| Example 6 | SiO/C | 0.4 | 0.8 | 10 | 5 | EMS | 15 | FDEC | 70 | — | — |
| Example 7 | SiO/C | 0.4 | 0.8 | 10 | 5 | EMS | 15 | FMPC | 70 | — | — |

TABLE 1-continued

| | Negative electrode active material | Electrolyte solution composition | | | | | | | | |
|---|---|---|---|---|---|---|---|---|---|---|
| | | LiPF$_6$ mol/L | LiFSI mol/L | EC conc. vol % | FEC conc. vol % | Sulfone compound Compound | vol % | Open chain carbonate Compound | vol % | Another solvent Compound | vol % |
| Example 8 | SiO/C | 0.4 | 0.8 | 10 | 5 | EMS | 15 | MEC | 70 | — | — |
| Example 9 | SiO/C | 0.4 | 0.8 | 10 | 5 | EMS | 15 | DMC | 70 | — | — |
| Example 10 | SiO/C | 0.4 | 0.8 | 10 | 5 | EMS | 15 | DEC | 55 | FE1 | 15 |
| Example 11 | SiO/C | 1 | 0.2 | 10 | 5 | EMS | 15 | DEC | 70 | — | — |
| Comparative Example 1 | SiO/C | 0.4 | 0.8 | 5 | 0 | EMS | 25 | DEC | 70 | — | — |
| Comparative Example 2 | SiO/C | 0.4 | 0.8 | 25 | 5 | — | — | DEC | 70 | — | — |
| Comparative Example 3 | SiO/C | 0.4 | 0.8 | 10 | 5 | SL | 15 | DEC | 70 | — | — |
| Comparative Example 4 | SiO/C | 1.2 | 0 | 10 | 5 | EMS | 15 | DEC | 70 | — | — |
| Comparative Example 5 | SiO/C | 0.4 | 0.8 | 10 | 5 | DMS | 15 | — | — | FE1 | 70 |
| Comparative Example 6 | Graphite | 0.4 | 0.8 | 10 | 5 | DMS | 15 | DEC | 70 | — | — |
| Comparative Example 7 | Graphite | 1 | 0 | 10 | 5 | DMS | 15 | DEC | 70 | — | — |

Secondary Battery

The electrode stack was accommodated in an aluminum laminate film as an outer package, and the electrolyte solution was injected inside the outer package. Subsequently, the outer package was sealed while the pressure was reduced to 0.1 atm, and a secondary battery was produced.

Evaluation

The fabricated secondary battery was charged to 4.2 V and then discharged at 0.2 C to 2.5 V to measure 0.2 C discharge capacity. Next, the battery was charged to 4.2 V again and then discharged at 5 C to 2.5 V to measure 5 C discharge capacity. "Discharge rate characteristic" was calculated by (5 C discharge capacity)/(0.2 C discharge capacity)×100 (unit: %).

Next, 500 cycles of charge and discharge were repeated to evaluate capacity retention rate. In the charge, the secondary battery was charged at 1 C to 4.2 V and then subjected to constant voltage charge for 2.5 hours in total. In the discharge, the secondary battery was subjected to constant current discharge at 1 C to 2.5 V. "Capacity retention rate" was calculated by (discharge capacity at the 500$^{th}$ cycle)/(discharge capacity at the first cycle)×100 (unit: %). In addition, the increase amount of the cell volume during the charge at the 500$^{th}$ cycle to the cell volume during the charge at the first cycle was also measured. Table 2 shows the results.

TABLE 2

| | After 500 cycles at 45° C. | | |
|---|---|---|---|
| | Capacity retention rate % | Discharge rate characteristic % | Volume increase cc per 1 g of positive electrode active material |
| Example 1 | 73.0 | 47 | 0.022 |
| Example 2 | 73.1 | 48 | 0.020 |
| Example 3 | 63.0 | 26 | 0.062 |
| Example 4 | 72.0 | 18 | 0.086 |
| Example 5 | 71.0 | 47 | 0.025 |
| Example 6 | 65.0 | 18 | 0.027 |
| Example 7 | 64.3 | 17 | 0.031 |
| Example 8 | 72.5 | 50 | 0.088 |
| Example 9 | 72.3 | 46 | 0.110 |
| Example 10 | 71.3 | 30 | 0.020 |
| Example 11 | 70.0 | 44 | 0.019 |
| Comparative example 1 | 55.0 | <10% | 0.020 |
| Comparative example 2 | 70.7 | 45 | 0.528 |
| Comparative example 3 | 69.9 | 30 | 0.050 |
| Comparative example 4 | 61.5 | <10% | 0.024 |
| Comparative example 5 | 73.2 | <10% | 0.018 |
| Comparative example 6 | 75.0 | <10% | 0.026 |
| Comparative example 7 | 75.1 | <10% | 0.027 |

In Comparative example 1, fluoroethylene carbonate, which is a fluorinated cyclic carbonate, was not added. The capacity retention rate and rate characteristic after 500 cycles were remarkably low, compared to the other examples.

In Comparative example 2, an open chain sulfone compound was not added. The volume increase after 500 cycles was remarkably large, compared to the other examples.

In Comparative example 3, sulfolane, which is a cyclic sulfone compound, was used instead of an open chain sulfone compound. Comparing Examples 1 and 2 and Comparative example 3, the electrolyte solutions of which have the same composition except for sulfone compound, it was found that the batteries of Examples 1 and 2 were more excellent in capacity retention rate and rate characteristic. From these examples, an effect of an open chain sulfone compound can be recognized.

In Comparative example 4, LiFSI was not added. In Comparative example 5, an open chain carbonate was not added. In Comparative examples 6 and 7, a silicon material was not used in the negative electrode active material.

Compared to the other examples, these examples had significantly low rate characteristics.

INDUSTRIAL APPLICABILITY

The lithium ion secondary battery according to the present embodiment can be utilized in, for example, all the industrial fields requiring a power supply and the industrial fields pertaining to the transportation, storage and supply of electric energy. Specifically, it can be used in, for example, power supplies for mobile equipment such as cellular phones and notebook personal computers; power supplies for electrically driven vehicles including an electric vehicle, a hybrid vehicle, an electric motorbike and an electric-assisted bike, and moving/transporting media such as trains, satellites and submarines; backup power supplies for UPSs; and electricity storage facilities for storing electric power generated by photovoltaic power generation, wind power generation and the like.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

EXPLANATION OF SYMBOLS

10 film outer package
20 battery element
25 separator
30 positive electrode
40 negative electrode

The invention claimed is:
1. A lithium ion secondary battery comprising:
   (i) a negative electrode comprising a negative electrode active material comprising a silicon material, and
   (ii) an electrolyte solution comprising:
      (ii-1) an electrolyte solvent comprising an open chain sulfone compound, a fluorinated cyclic carbonate and an open chain carbonate, wherein the electrolyte solvent comprises less than 5 volume % of a fluorinated ether or does not comprise a fluorinated ether, and
      (ii-2) a supporting salt comprising $LiN(FSO_2)_2$.
2. The lithium ion secondary battery according to claim 1, wherein a content of the open chain sulfone compound in the electrolyte solvent is 5 volume % or more and 80 volume % or less.
3. The lithium ion secondary battery according to claim 1, wherein a content of the open chain carbonate in the electrolyte solvent is 20 volume % or more and 90 volume % or less.
4. The lithium ion secondary battery according to claim 1, wherein the supporting salt further comprises $LiPF_6$.
5. The lithium ion secondary battery according to claim 4, wherein a ratio of $LiN(FSO_2)_2$ with respect to the total amount of $LiPF_6$ and $LiN(FSO_2)_2$ is 50 mol % or more.
6. The lithium ion secondary battery according to claim 1, wherein the electrolyte solvent further comprises a cyclic carbonate other than the fluorinated cyclic carbonate.
7. The lithium ion secondary battery according to claim 1, wherein a content of the silicon material is 50 weight % or more of the total amount of the negative electrode active material.
8. A vehicle equipped with the lithium ion secondary battery according to claim 1.
9. A method for manufacturing a lithium ion secondary battery, comprising the steps of:
   fabricating an electrode element by stacking a positive electrode and a negative electrode via a separator, and
   enclosing the electrode element and an electrolyte solution into an outer package,
   wherein the negative electrode comprises a negative electrode active material comprising a silicon material, and the electrolyte solution comprises an electrolyte solvent comprising an open chain sulfone compound, a fluorinated cyclic carbonate and an open chain carbonate and a supporting salt comprising $LiN(FSO_2)_2$,
   wherein the electrolyte solvent comprises less than 5 volume % of a fluorinated ether or does not comprise a fluorinated ether.
10. The lithium ion secondary battery according to claim 1, wherein the lithium ion secondary battery further comprises (iii) a positive electrode comprising a positive electrode active material represented by formula (A):

$$Li_yNi_{(1-x)}M_xO_2 \qquad (A),$$

wherein, in formula (A), $0 \leq x < 0.4$; $0 < y \leq 1.2$; and M is at least one element selected from the group consisting of Co, Al, Mn, Fe, Ti, and B.
11. The method according to claim 9, wherein the positive electrode comprises a positive electrode active material represented by formula (A):

$$Li_yNi_{(1-x)}M_xO_2 \qquad (A),$$

wherein, in formula (A), $0 \leq x < 0.4$; $0 < y \leq 1.2$; and M is at least one element selected from the group consisting of Co, Al, Mn, Fe, Ti, and B.

* * * * *